Nov. 22, 1966   L. GYONGYOSI   3,286,777
ROCK DRILL PIPE STORAGE AND HANDLING DEVICE
Filed July 18, 1963   6 Sheets-Sheet 1

INVENTOR.
LASZLO GYONGYOSI
BY
ATTORNEY

INVENTOR.
LASZLO GYONGYOSI
BY
ATTORNEY

Nov. 22, 1966  L. GYONGYOSI  3,286,777
ROCK DRILL PIPE STORAGE AND HANDLING DEVICE
Filed July 18, 1963  6 Sheets-Sheet 3

INVENTOR.
LASZLO GYONGYOSI
BY
ATTORNEY

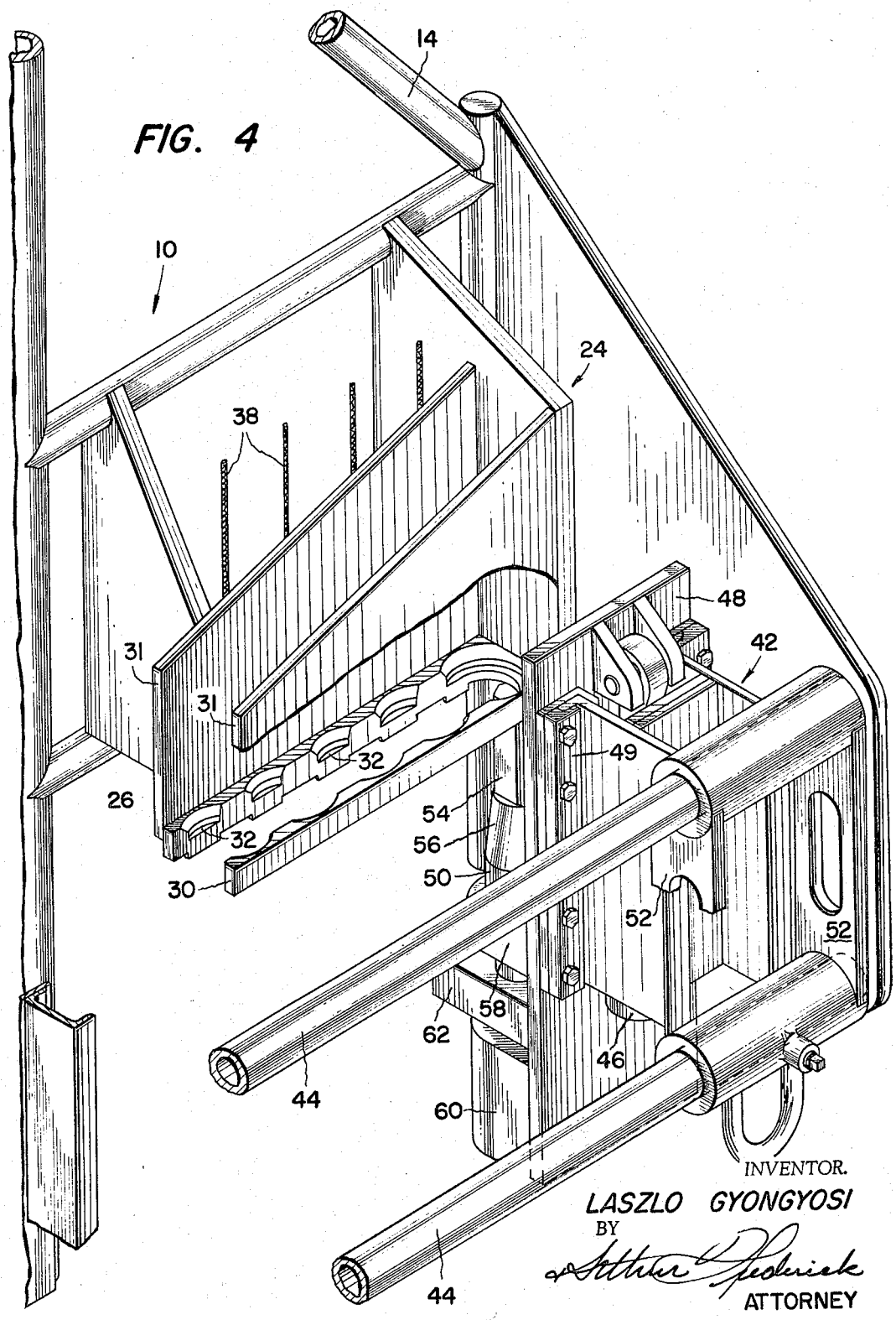

Nov. 22, 1966 L. GYONGYOSI 3,286,777
ROCK DRILL PIPE STORAGE AND HANDLING DEVICE
Filed July 18, 1963 6 Sheets-Sheet 5

INVENTOR.
LASZLO GYONGYOSI
BY
ATTORNEY

Nov. 22, 1966  L. GYONGYOSI  3,286,777
ROCK DRILL PIPE STORAGE AND HANDLING DEVICE
Filed July 18, 1963  6 Sheets-Sheet 6

INVENTOR.
LASZLO GYONGYOSI
BY
ATTORNEY

United States Patent Office 3,286,777
Patented Nov. 22, 1966

3,286,777
ROCK DRILL PIPE STORAGE AND
HANDLING DEVICE
Laszlo Gyongyosi, Easton, Pa., assignor to Ingersoll-Rand Company, New York, N.Y., a corporation of New Jersey
Filed July 18, 1963, Ser. No. 295,899
11 Claims. (Cl. 175—52)

This invention relates to rock drilling apparatus and more particularly to a rock drilling apparatus equipped with a drill pipe storing and handling apparatus.

Conventional drill pipe storing and handling apparatus include various types of racks for receiving, supporting and storing the drill pipes, the racks usually being employed to move the drill pipes into and out of alignment with the drill hole. The handling of the drill pipes by the rack in addition to storing and supporting the drill pipes usually requires extremely complicated mechanisms for shifting and indexing the drill pipes.

Accordingly, a principal object of the invention is to provide a drill pipe storing and handling apparatus of simplified design.

Another object of this invention is to provide a drill pipe storing and handling apparatus which is economical to manufacture.

Still another object of this invention is to provide a drill pipe storing and handling apparatus which is durable and efficient.

Figure 1:
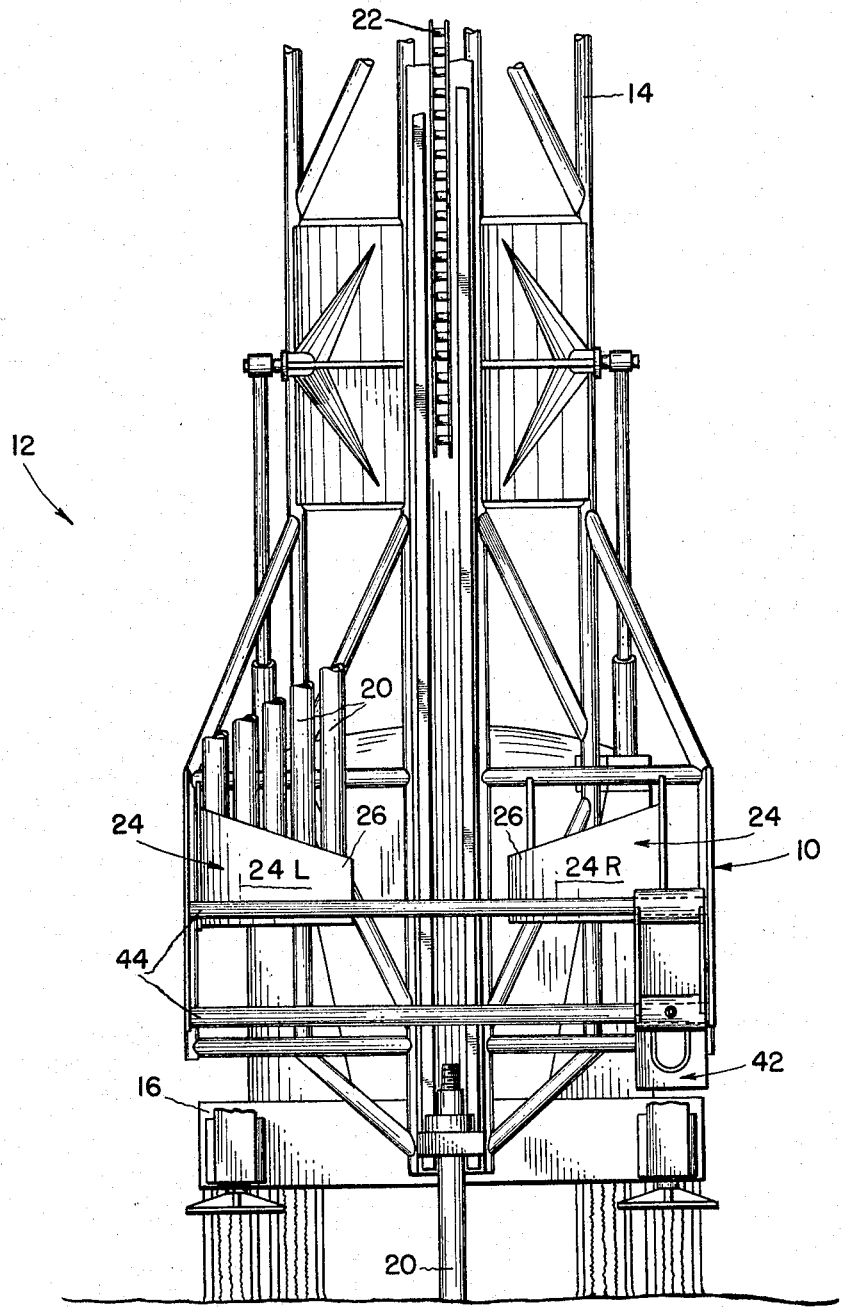
Figure 2:
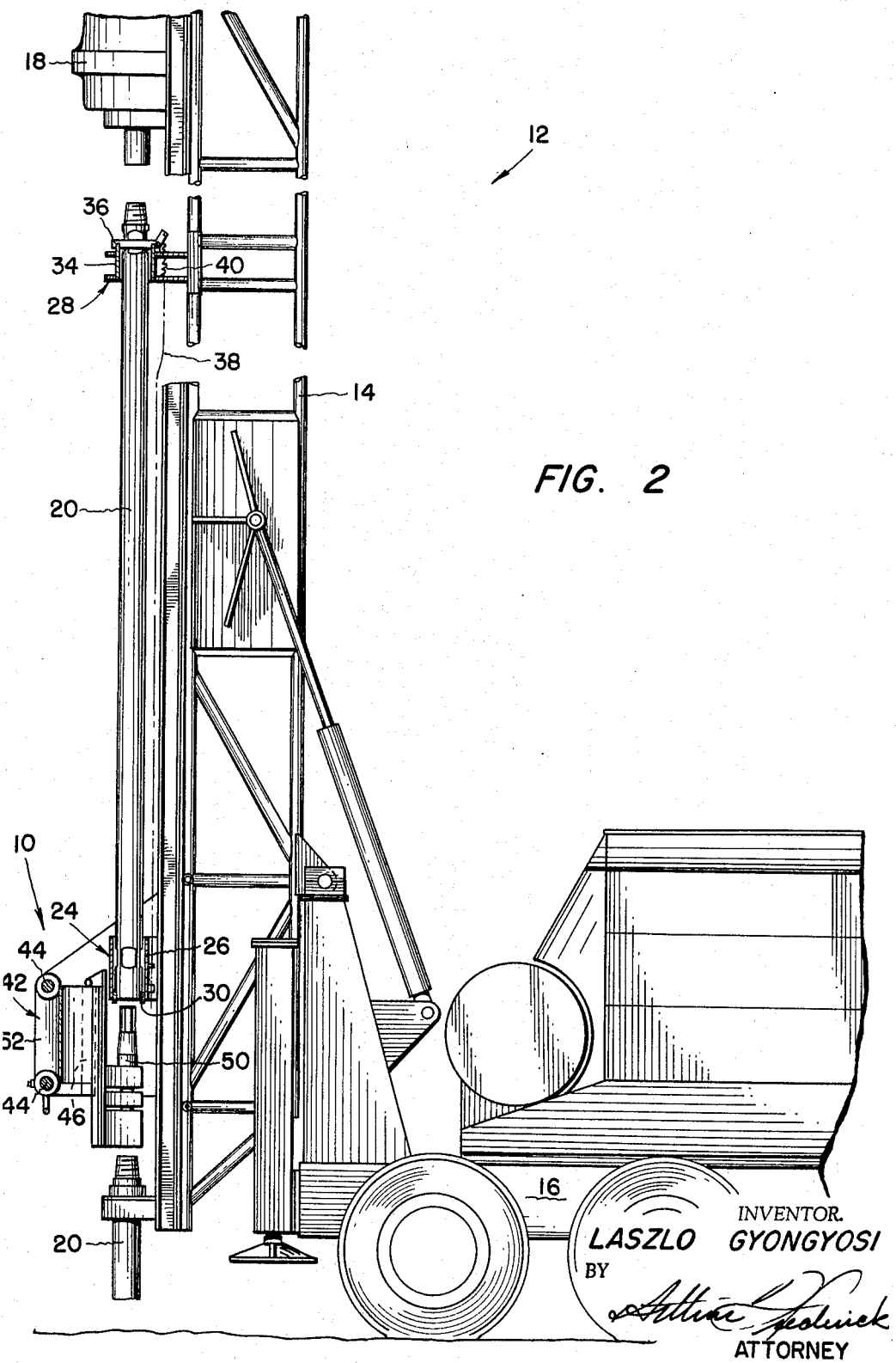
Figure 3:
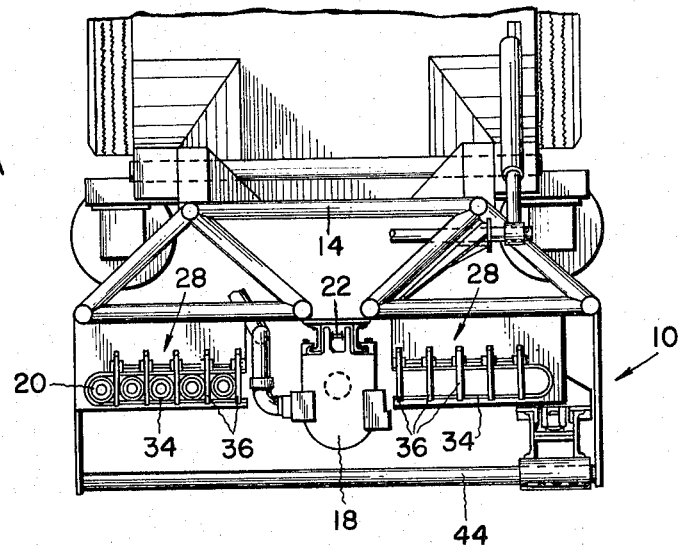
Figure 8:
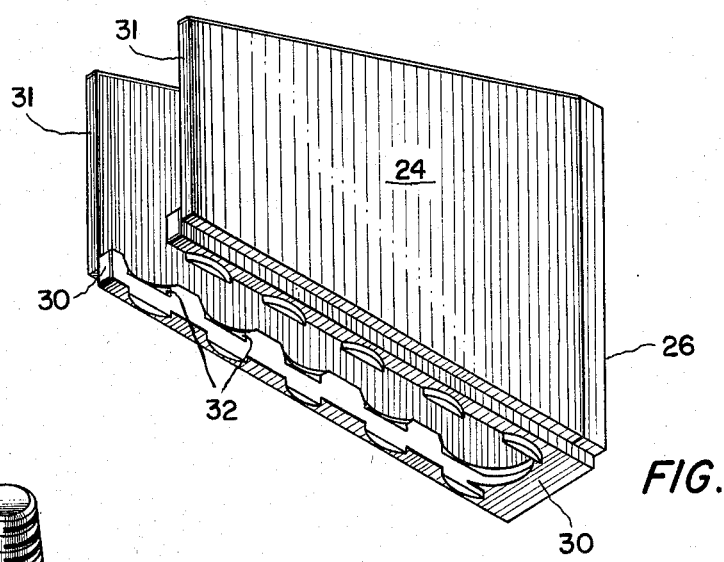
Figure 9:
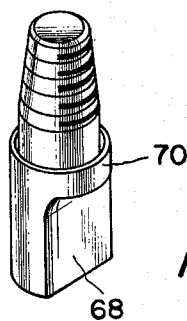
Figure 5:
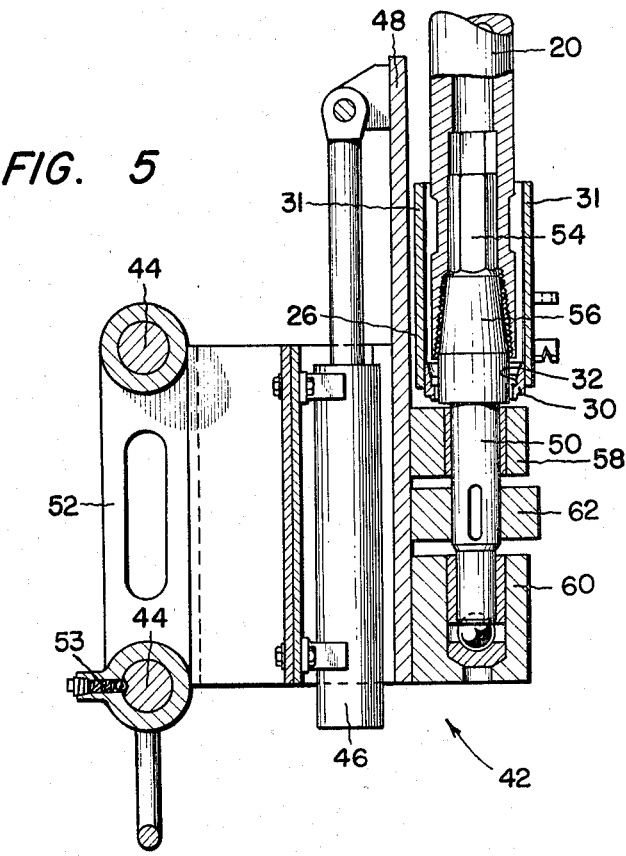
Figure 6:
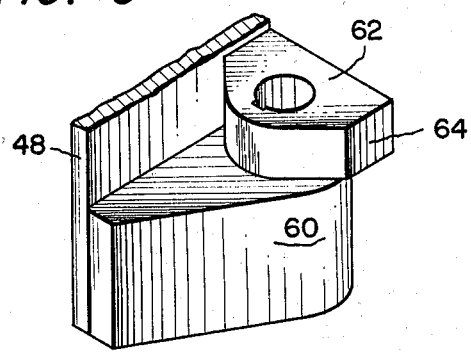
Figure 7:
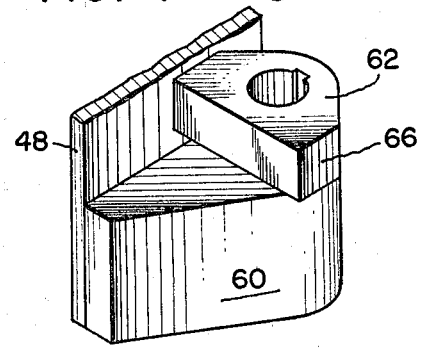
Figure 10:
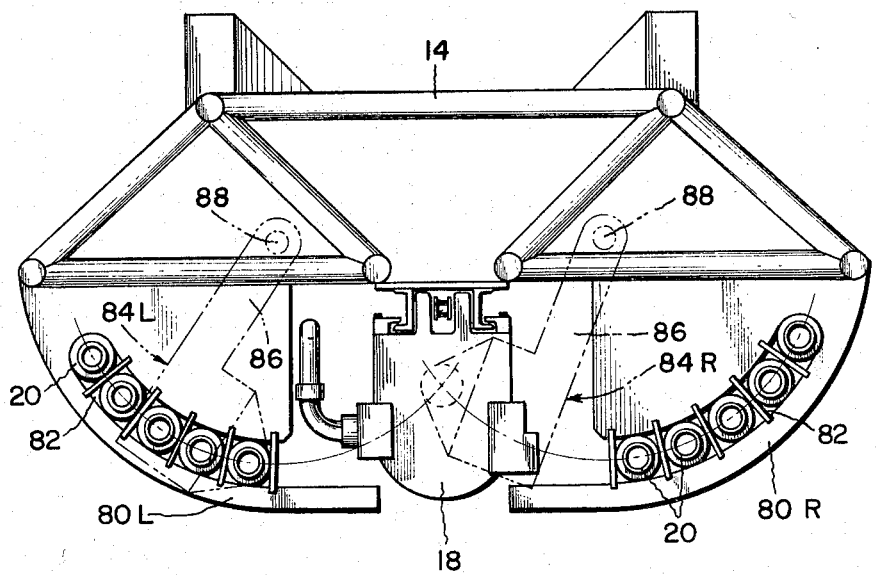
Figure 11:
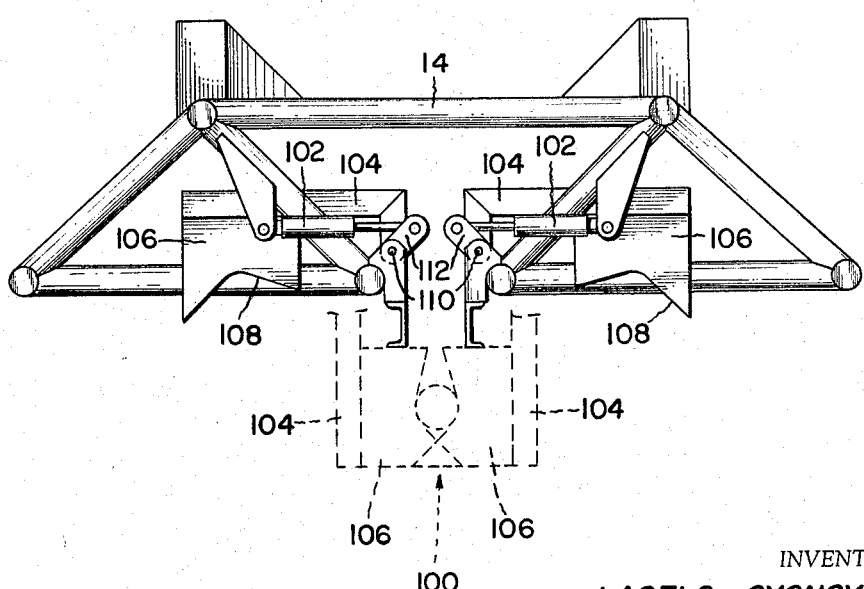

Other objects and advantages of the invention will be pointed out specifically or will become apparent from the following description when it is considered in conjunction with the appended claims and the accompanying drawings, in which:

FIGURE 1 is a front view of the lower portion of the rock drilling apparatus according to this invention, FIG. 2 shows partially in section a side view of the drill pipe storing and handling apparatus mounted on a rock drilling apparatus (partly shown), FIG. 3 is a top view of the drill pipe storing and handling apparatus mounted on a rock drilling apparatus, FIG. 4 is a perspective view of the lower right hand side portion of the drill pipe storing and handling apparatus, FIG. 5 is a sectional view of the carrier of the drill pipe storing and handling apparatus, FIGS. 6 and 7 show exploded views of the blocking member in two extreme positions, FIG. 8 is a perspective view of the base plate and upstanding walls of the right hand side rack, FIG. 9 is a perspective view of the plug-like clamp member for the drill pipes in the racks, FIG. 10 shows diagrammatically another embodiment of the drill pipe racks and associated carriers, and FIG. 11 shows diagrammatically a centralizer arrangement for the upper end portions of the drill pipes.

The novel drill pipe storing and handling apparatus is designated 10 and is shown in FIGS. 1, 2 and 3 in association with a conventional type rotary rock drilling apparatus designated 12. The rock drilling apparatus comprises a vertical derrick or tower structure 14 mounted on a mobile base 16 (partly shown). A rotary head or rotating mechanism 18 is movably mounted on the tower structure 14 to be longitudinally guided along the tower structure to rotate the drill pipes 20 forming the drill string. Rotary head 18 is connected to a motor actuated feed chain 22 which serves to move the rotary head longitudinally along the tower structure to lower the drill string into the hole being drilled, or to raise the drill string from the hole being drilled. The drill string is made up of drill pipes 20 screwed in end to end relation to each other. The arrangements with which the drill pipes to be added to the drill string are transferred from the drill pipe storing apparatus to the rotary head 18, and with which the drill pipes detached from the drill string are transferred from the rotary head to the drill pipe storing apparatus are to be described hereinafter.

Storage of the drill pipes is achieved by providing stationary racks 24, rack 24L positioned to the left of the axis of the rotary head, and rack 24R positioned to the right of the axis of the rotary head. Each rack comprises a base 26 to support the bottom end of the drill pipes. A retainer 28 is located on the derrick above the rack for engaging the upper portions of the drill pipes to maintain the drill pipes in an upright position. The racks 24L and 24R are positioned to provide for storing the drill pipes in a straight line pattern, the extended center lines of the racks intersecting the axis or path of movement of the rotary head 18. The base of each rack, see FIGS. 4 and 8, comprises a base plate 30 having a portion cut out to form a U-shaped support for the row of drill pipes, preferably five drill pipes for each rack. Each of the opposing portions of base plate 30 is provided with an upstanding wall 31, and recesses cooperating with each other to form sockets 32 within which the forward ends of the drill pipes are received. Sockets 32 are adapted to support only the opposing segments of the forward end of each drill pipe to provide for free access to the interior of the forward end portion of each drill pipe for purposes to be explained hereinafter.

The retainer 28, see FIGS. 2 and 3, of each of the racks comprises a U-shaped guide 34, and pivotable latches 36 mounted to cooperate with guide 34 to form an enclosure for each of the upper end portions of the drill pipes when the latches are in a closed position with their end portions in suitable slots (not shown). The latches are manually operated and each latch is provided with a cord or cable 38 and spring 40 arrangement, spring 40 constantly urging the associated latch in a closed position, as shown in FIG. 2.

Transfer of the drill pipes from the racks to the rotary head, or from the rotary head to the racks is achieved by a drill pipe carrier 42 slidably supported by a pair of substantially horizontal guide bars 44 connected to the dirrick, see FIGS. 2, 4, and 5. The guide bars are positioned to provide for parallel movement of the carrier 42 relative to the center line of the racks 24 from the extreme right hand side to the extreme left hand side of the racks. Carrier 42 includes a vertically positioned conventional type rectilinear pressure fluid operated motor 46 which is connected to a lift member 48 carrying a spike 50 for insertion into the forward end portion of a drill pipe in the rack. Lift member 48 is raised or lowered along a vertical guide frame 49 by motor 46 to raise or lower spike 50, motor 46 being attached to a frame 52 slidably mounted on horizontal guide bars 44. Carrier 42 is so positioned that, in a lowered position, the spike 50 freely moves horizontally below the racks to be positioned in axial alignment with either one of the drill pipes in the racks as well as in axial alignment with the rotary head.

Detent means 53, see FIG. 5, is provided to automatically stop the carrier each time the spike is in axial alignment with either the rotary head or with any one of the drill pipes in the racks. It is, however, to be noted that when the carrier is to be moved beyond a detent stop point, only a slight force is needed to overcome the locking effect of detent means 53.

Spike 50, see FIG. 5, includes an end portion 54, preferably of hexagonal shape, corresponding to the hexagonally contoured interior of the forward end portion of the drill pipes, and a conical portion 56 corresponding to the internal conical threaded section of the forward end portion of the drill pipes. The purpose of the aforementioned shape of spike 50 is to provide for adequate support for the drill pipe when being vertically transferred from one of the racks to a position in axial alignment with the rotary head or vice versa as will be explained hereinafter. The spike is rotatably supported by brackets 58 and 60 attached to lift member 48, however, it is limited in its rotary movement by a blocking member 62 keyed to the spike and positioned between brackets 58 and 60. Blocking member 62 is formed with two opposing contact faces 64, 66 positioned for engaging lift member 48 when the blocking member is rotated to permit only a 180° turn in either direction. As shown in FIGS. 6 and 7, the shape of blocking member 62 permits the spike to rotate 180° in either direction, counterclockwise and clockwise. From the position shown in FIG. 7, blocking member 62 is permitted to rotate only 180° in a counterclockwise direction to a position shown in FIG. 6, contact face 66 being in engagement with lift member 48. The blocking member is permitted to rotate only 180° in a clockwise direction from the position shown in FIG. 6 to a position shown in FIG. 7, contact face 64 being in engagement with lift member 48. The reason for this arrangement will be apparent hereinafter.

When a drill pipe is to be transferred from the racks and connected to the rotary head, assuming that carrier 42 is positioned as shown in FIG. 1 and both racks are fully loaded with five drill pipes each, the first operation is to raise the rotary head 18 above the upper ends of the drill pipes in the racks. Carrier 42 is then moved from its position shown in FIG. 1 and, with the spike 50 in a lowered position as shown in FIG. 2, into axial alignment with the first drill pipe, i.e., the drill pipe in either one of the racks closest to the axis of the rotary head 18, for instance, the first drill pipe in rack 24R to the right of the rotary head. The latch associated with the drill pipe to be transferred is actuated to permit the upper end portion of the drill pipe to be removed from retainer 28. When the carrier 42 is positioned with the spike 50 in axial alignment with the first drill pipe, as indicated by detent means 53, motor 46 is operated to raise spike 50, see FIG. 5. Spike 50 being rotatable and having its upper end chamfered is substantially self-centering, so that misalignment of the hexagonal end portion 54 of spike 50 relative to the hexagonal contoured interior of the forward end portion of the drill pipe is easily corrected to provide for proper insertion of the spike into the forward or lower end portion of the drill pipe. The drill pipe, after insertion of the spike into the forward end portion of the drill pipe, is slightly raised from base plate 30 by motor 46. The carrier, now vertically carrying a drill pipe, is either manually or by other suitable means moved to the left until the drill pipe is in axial alignment with the rotary head 18. Drill head 18 is lowered and rotated to cause the drill pipe to be screwed to the rotary head, blocking member 62 preventing rotation of spike 50, and spike 50 in turn preventing rotation of the drill pipe because of the hexagonal end portion 54 of the spike being inserted into the hexagonally contoured interior of the forward end portion of the drill pipe. The rotary head is then raised to remove the drill pipe from the carrier whereafter the carrier can be positioned for the following operation of transferring a second drill pipe from the racks.

When a drill pipe is to be transferred from the drill string to the racks, and the joint between the drill pipe and the drill string in the drill hole has already been broken by commonly known means, rotary head 18 with the drill pipe screwed thereto is raised to permit spike 50 of carrier 42 to be positioned under the drill pipe and in axial alignment therewith. Spike 50 is then raised to be inserted into the forward end portion of the drill pipe, whereafter the rotary head is rotated in a counterclockwise direction to cause the drill pipe to be unscrewed from the rotary head. When the blocking member 62 is positioned as shown in FIG. 7, counterclockwise rotation of the rotary head rotates the drill pipe and spike 50 including blocking member 62 until the right hand side contact face 66 of blocking member 62 engages the lift member 48 to abruptly prevent blocking member 62 and spike 50 keyed thereto from further rotation. The sudden engagement of contact face 66 of blocking member 62 with lift member 48 while the rotary head continues rotating causes even a tight joint between the rotary head and the drill pipe to be broken. After the joint between the rotary heal and the drill pipe has been broken, the rotary head is raised to permit the forward or lower end of the drill pipe to be positioned higher than the base plate of the associated rack. The carrier is then moved to carry the drill pipe into the associated rack whereafter the spike is lowered to provide for the drill pipe to be inserted in an associated socket 32 of the base plate of the rack.

A plug-like clamp member 68 is provided for each drill pipe in the racks, see FIG. 9, clamp member 68 to be tightly screwed into the forward end of the drill pipe to cause the flange 70 of the clamp member to rigidly engage the bottom of the base plate 30 of the racks. With this arrangement the drill pipes are screwed to the base plates of the racks to prevent the drill pipes from falling out of the racks when the derrick to which the racks are connected is positioned substantially horizontally for transportation of the rock drilling apparatus.

An alternate arrangement of the drill pipe racks is diagrammatically shown in FIG. 10. The racks are designated 80 and comprise two arcuate racks 80L and 80R having their extending arcuate center lines intersecting the path of movement of the rotary head 18 and constructed similar to the structure of racks 24L and 24R. Retainers 82 for the drill pipes in racks 80L and 80R are also arcuate shaped and constructed similarly to the structure of retainer 28 of racks 24L and 24R. Transfer of the drill pipes from the racks to the rotary head, or from the rotary head to the racks is achieved by a pair of carriers 84L and 84R, carrier 84L serving rack 80L, and carrier 84R serving rack 80R. Each carrier is pivotally mounted on the derrick and includes an arm 86 pivotable about a shaft 88, shaft 88 being suitably supported by brackets and bearings (not shown) mounted on the derrick. A motor 46 and spike 50 arrangement identical to that connected to frame 52, as shown in FIG. 5, is mounted on the free end of the arm 86, spike 50 being positioned to be swung in a radius corresponding to the radius of the arcuate rack. With this arrangement the spike can be swung by arm 86, either manually or by other suitable means, into axial alignment with either one of the drill pipes in the associated rack as well as with the rotary head for transfer of the drill pipes from the rack to the rotary head or vice versa.

Another feature of the invention is diagrammatically shown in FIG. 11 in the form of a centralizer 100, a device to actuate and hold the upper end portion of the drill pipes in axial alignment with the rotary head when the drill pipes are positioned for connection to the rotary head. A frequent occurrence in drilling operations is that the drill pipes become slightly twisted or bent as a consequence of rough handling of the drill pipes, and although the lower end of each of the drill pipes is held axially aligned with the rotary head, it is difficult to properly align the upper end of the drill pipes for connection with the rotary head. Accordingly then, centralizer 100 is mounted adjacent the retainers of the racks and includes a pair of conventional rectilinear type pressure fluid operated motors 102 connected to a pair of arms 104 and clamping members 106 adapted to cooperate with each other to clamp and hold the upper end of each drill pipe in axial alignment with the rotary head. Each arm 104 is provided with a flag-like clamping member 106 having a wide angle V-shaped forward end 108, each arm 104 mounted to swing about a shaft 110 into engagement with the drill pipe to be centralized. Shafts 110 are connected to crank arms 112 which in turn are connected to be actuated by motors 102.

When a slightly bent drill pipe is to be connected to the rotary head, and the drill pipe is held with its upper end off center relative to the axis of the rotary head, motors 102 are operated to cause arms 104 and clamping members 106 connected thereto to be swung about shafts 110 towards each other from a position shown in solid lines to a position shown in dotted lines. During movement of the clamping members 106 towards each other, the offset upper end of the drill pipe is engaged by the angularly extending forward end portions of the clamping members and urged inwardly into a position in axial alignment with the rotary head. The drill pipe is automatically held in the position shown to permit proper alignment of the upper end of the drill pipe for connection to the rotary head, whereafter the clamping members 106 are withdrawn by reversing the operation of motors 102.

While I have shown preferred forms of structure embodying the invention, structural modifications may be made therein without departing from the spirit and scope of my invention as set forth in the appended claims.

I claim:
1. In a rock drilling apparatus, the combination of
    (a) a derrick mounted on a base,
    (b) a rotary head mounted on said derrick for longitudinal movement along said derrick,
    (c) a stationary rack mounted on said derrick adapted to store a plurality of drill pipes vertically,
    (d) a movable carrier having means to engage the bottom end of a single drill pipe and support that drill pipe vertically, and
    (e) means supported by said derrick to support said carrier and said pipe support means for movement into positions for individual engagement and support of each of said drill pipes in said rack and for movement to carry each of said drill pipes individually into axial alignment with said rotary head.

2. In a rock drilling apparatus, the combination of
    (a) a derrick mounted on a base,
    (b) a rotary head mounted on said derrick for longitudinal movement along said derrick,
    (c) a stationary rack mounted on said derrick adapted to store a plurality of drill pipes vertically,
    (d) a movable carrier having means to engage the bottom end of a single drill pipe and support that drill pipe vertically, and
    (e) guide means supported by said derrick positioned to guide said carrier and said pipe support means for movement into positions for individual engagement and support of each of said drill pipes in said rack and for movement to carry each of said drill pipes individually into axial alignment with said rotary head.

3. In a rock drilling apparatus, the combination of
    (a) a derrick mounted on a base,
    (b) a rotary head mounted on said derrick for longitudinal movement along said derrick,
    (c) a stationary rack transversely displaced from the axis of said rotary head mounted on said derrick adapted to store a plurality of drill pipes vertically in a row,
    (d) said rack formed with a base to engage and support said drill pipes and being positioned with its center line intersecting the axis of said rotary head,
    (e) a movable carrier having means to engage the end of a single drill pipe and support that drill pipe vertically, and
    (f) guide means supported by said derrick positioned to guide said carrier and said pipe support means for movement into positions for individual engagement and support of each of said drill pipes in said rack and for movement to carry each of said drill pipes individually into axial alignment with said rotary head.

4. The rock drilling apparatus claimed in claim 3 in which said pipe support means to engage and support a drill pipe vertically includes a vertical spike member having its upper end portion formed in correspondence with the interior of the forward end portion of said drill pipes, and motor means mounted on said carrier and connected to said spike member to lower and raise said spike member into and out of engagement with said drill pipes.

5. In a rock drilling apparatus, the combination of
    (a) a derrick mounted on a base,
    (b) a rotary head mounted on said derrick for longitudinal movement along said derrick,
    (c) a stationary rack transversely displaced from the axis of said rotary head mounted on said derrick adapted to store a plurality of drill pipes vertically in a row,
    (d) said rack formed with a base to support said drill pipes and being positioned with its center line intersecting the axis of said rotary head,
    (e) a movable carrier having means to engage the bottom end of a single drill pipe and support that drill pipe vertically, and
    (f) guide means supported by said derrick and positioned parallel to said center line of said rack to guide said carrier and said pipe support means for movement into positions for individual engagement and support of each of said drill pipes in said rack and for movement to carry each of said drill pipes individually into axial alignment with said rotary head.

6. In a rock drilling apparatus, the combination of
    (a) a derrick mounted on a base,
    (b) a rotary head mounted on said derrick for longitudinal movement along said derrick,
    (c) a pair of stationary racks transversely displaced from the axis of said rotary head and mounted on said derrick, each rack being adapted to store a plurality of drill pipes vertically in a row,
    (d) each of said racks being formed with a base to support said drill pipes and being positioned with their center lines in alignment with each other and intersecting the axis of said rotary head,
    (e) a movable carrier having means to engage the end of a single drill pipe and support that drill pipe vertically, and
    (f) guide means supported by said derrick and positioned parallel to said center lines to guide said carrier and said pipe support means for movement into positions for engagement and support of each of said drill pipes in said racks and for movement to carry each of said drill pipes individually into axial alignment with said rotary head.

7. In a rock drilling apparatus, the combination of
    (a) a derrick mounted on a base,
    (b) a rotary head mounted on said derrick for longitudinal movement along said derrick,
    (c) a stationary rack transversely displaced from the axis of said rotary head and mounted on said derrick, said rack being adapted to store a plurality of drill pipes vertically in a row,
    (d) said rack being formed with an arcuate base to support said drill pipes in an arcuate pattern and being positioned with its center line intersecting the axis of said rotary head,
    (e) a movable carrier having means to engage the end of a single drill pipe and support that drill pipe vertically, and
    (f) pivot means supported by said derrick and being positioned to swing said carrier and pipe support means into positions for individual engagement and support of each of said drill pipes in said rack and for movement to carry each of said drill pipes individually into axial alignment with said rotary head.

8. In a rock drilling apparatus, the combination of
    (a) a derrick mounted on a base,
    (b) a rotary head mounted on said derrick for longitudinal movement along said derrick, (c) a stationary rack mounted on said derrick and adapted to store a plurality of drill pipes vertically, (d) a movable carrier having means to engage the end of a single drill pipe and support that drill pipe vertically, (e) means supported by said derrick to carry said carrier and said pipe support means into positions for individual engagement and support of each of said drill pipes in said rack and for movement to carry each of said drill pipes individually into axial alignment with said rotary head, and (f) centralizer means mounted on said derrick rearwardly of said carrier to engage and guide the upper end portion of a drill pipe into axial alignment with the rotary head when the lower end of said drill pipe is held in axial alignment with the rotary head and the upper end portion of said drill pipe is misaligned relative to the axis of said rotary head.

9. The rock drilling apparatus claimed in claim 8 in which said centralizer means includes (a) a pair of generally V-shaped members positioned substantially horizontally in overlying planes and with their open ends transversely spaced from the axis of said rotary head, and (b) means to actuate said members towards each other and towards the axis of said rotary head to cause the open ends of said members to cooperate with each other to form a descreasing encompassment about the axis of said rotary head during a predetermined portion of travel of said members.

10. In a rock drilling apparatus, the combination of (a) a derrick mounted on a base, (b) a rotary head mounted on said derrick for longitudinal movement along said derrick, (c) a stationary rack transversely displaced from the axis of said rotary head and mounted on said derrick, said rack being adapted to store a plurality of drill pipes vertically in a row, (d) said rack formed with a base to support said drill pipes and being positioned with its center line intersecting the axis of said rotary head, (e) a movable carrier having means to engage the end of a single drill pipe and support that drill pipe vertically, (f) said means to engage and support a drill pipe vertically including a vertically positioned spike member having its upper end portion formed to fit into the interior of the bottom ends of said drill pipes, (g) a support member for rotatably carrying said spike member, (h) blocking means connected to said spike member for engagement with said support member to permit partial rotation of said spike member in either direction, (i) motor means mounted on said carrier and connected to said support member to lower and raise said support member and therewith said spike member into and out of engagement with said drill pipes, and (j) guide means supported by said derrick and being positioned to guide said carrier and said pipe support means for movement into positions for individual engagement and support of each of said drill pipes in said rack and for movement to carry each of said drill pipes individually into axial alignment with said rotary head.

11. In a rock drilling apparatus, the combination of (a) a derrick mounted on a base, (b) a rotary head mounted on said derrick for longitudinal movement along said derrick, (c) a stationary rack transversely displaced from the axis of said rotary head and mounted on said derrick, said rack being adapted to store a plurality of drill pipes vertically in a row, (d) said rack formed with a base to support said drill pipes and being positioned with its center line intersecting the axis of said rotary head, (e) a movable carrier having means to engage the end of a single drill pipe and support that drill pipe vertically, (f) said means to engage and support a drill pipe vertically including a vertically positioned spike member having its upper end portion formed to fit into the interior of the bottom ends of said drill pipes, (g) a support member for rotatably carrying said spike member, (h) blocking means connected to said spike member for engagement with said support member to permit partial rotation of said spike member in either direction, (i) motor means mounted on said carrier and connected to said support member to lower and raise said support member and therewith said spike member into and out of engagement with said drill pipes, (j) guide means supported by said derrick and positioned to guide said carrier and said pipe support means for movement into positions for individual engagement and support of each of said drill pipes in said rack and for movement to carry each of said drill pipes individually into axial alignment with said rotary head, (k) a pair of generally V-shaped members positioned substantially horizontally in overlying planes and with their open ends transversely spaced from the axis of said rotary head, and (l) means to actuate said members towards each other and towards the axis of said rotary head to cause the open ends of said members to cooperate with each other to form a decreasing encompassment about the axis of said rotary head during a predetermined portion of travel of said members.

References Cited by the Examiner
UNITED STATES PATENTS

| | | | |
|---|---|---|---|
| 2,633,333 | 3/1953 | Storm | 175—85 X |
| 2,781,185 | 2/1957 | Robbins | 175—52 |
| 2,998,084 | 8/1961 | Johnson et al. | 175—.85 |
| 3,025,918 | 3/1962 | Leven | 175—52 |
| 3,061,011 | 10/1962 | Paget | 175—85 X |

CHARLES E. O'CONNELL, *Primary Examiner.*

BENJAMIN BENDETT, *Examiner.*

N. J. MALONEY, R. E. FAVREAU, *Assistant Examiners.*